United States Patent [19]

Prosser

[11] Patent Number: 5,183,068
[45] Date of Patent: Feb. 2, 1993

[54] BALL AND SEAT VALVE

[75] Inventor: Albert C. Prosser, Norman, Okla.

[73] Assignee: Coors Technical Ceramics Company, Norman, Okla.

[21] Appl. No.: 710,137

[22] Filed: Jun. 4, 1991

[51] Int. Cl.$^5$ .............................................. F16K 15/04
[52] U.S. Cl. ................................... 137/1; 137/533.15; 251/362; 251/368
[58] Field of Search ....................... 137/533.11–533.15, 137/1; 251/362, 368

[56] References Cited

U.S. PATENT DOCUMENTS

| | | | |
|---|---|---|---|
| 1,074,191 | 9/1913 | Mixer | 137/533.13 |
| 1,642,724 | 9/1927 | Fleming | 137/533.13 |
| 1,757,139 | 5/1930 | Platenberg | 137/533.15 X |
| 2,593,520 | 4/1952 | Baker et al. | 166/1 |
| 3,027,914 | 4/1962 | Jones | 137/515.7 |
| 3,331,385 | 7/1967 | Taylor | 137/327 |
| 4,771,803 | 9/1988 | Berchem et al. | 137/375 |
| 4,795,133 | 1/1989 | Berchem et al. | 251/171 |
| 4,815,704 | 3/1989 | Berchem | 251/315 |
| 4,832,075 | 5/1989 | Dubach | 137/533.11 X |

OTHER PUBLICATIONS

Downhole Products (brochure), Coors Ceramics Company (undated).
"Specification for Subsurface Sucker Rod Pumps and Fittings", American Petroleum Institute, API Specification IIAX (Spec. IIAX), Eighth Edition, May 30, 1986.

Primary Examiner—Robert G. Nilson
Attorney, Agent, or Firm—Sheridan, Rosst, McIntosh

[57] ABSTRACT

The present invention relates to a ball and seat valve having an improved design that increase the reliability and fracture resistance of the seat. The fracture resistance of the seat is increased by providing the seat with a beveled edge. When a force is exerted on the seat along its central axis, the beveled edge creaes a compressive component of force on the inside of the seat. The ball and seat valve is particularly useful when the seat is fabricated from a ceramic material. The ball and seat valve is useful in industries where it is subjected to a highly corrosive environment, such as the oil pumping industry.

17 Claims, 1 Drawing Sheet

U.S. Patent      Feb. 2, 1993      5,183,068
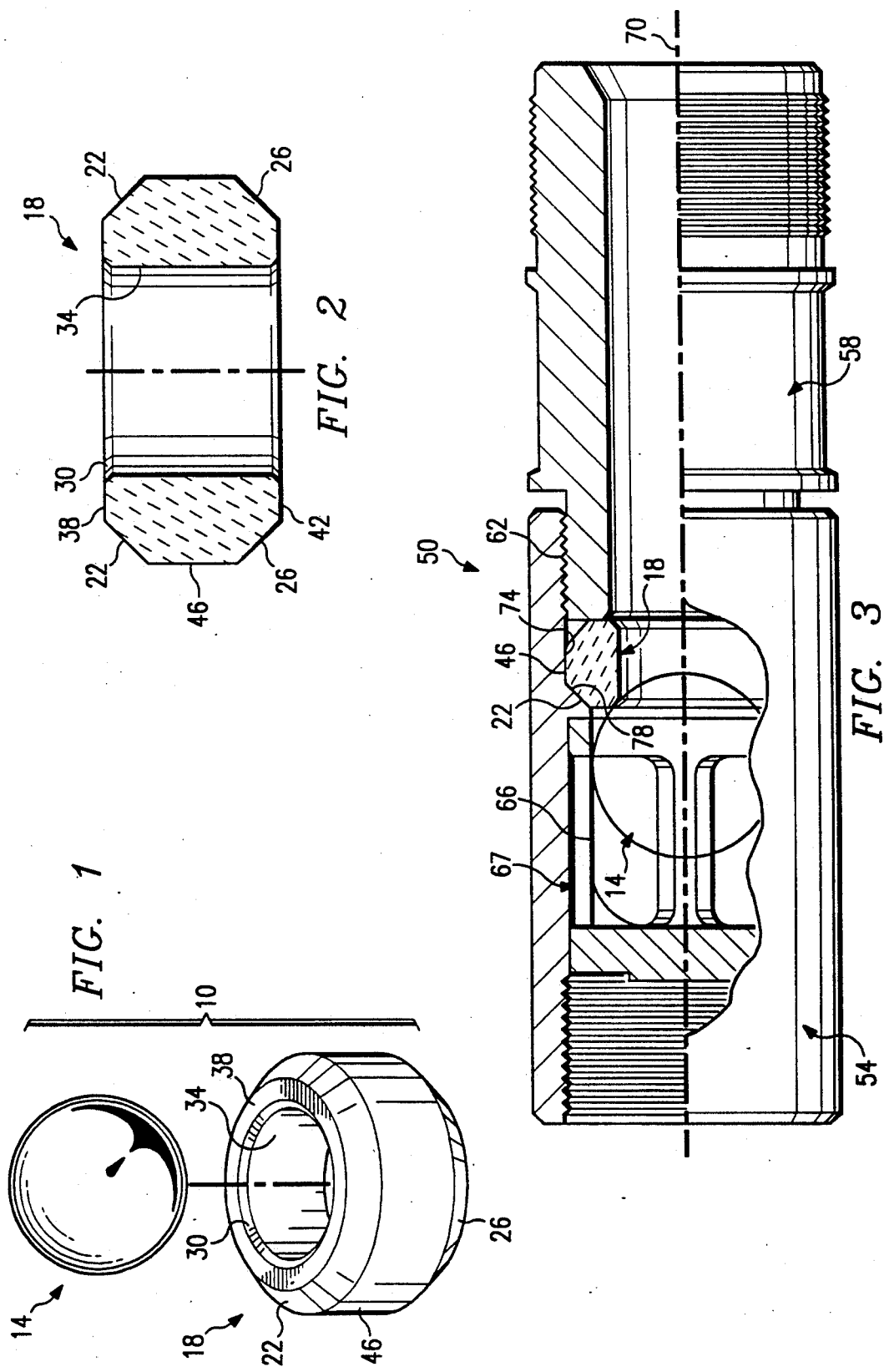

BALL AND SEAT VALVE

FIELD OF THE INVENTION

The present invention pertains to ball and seat valves. More particularly, the present invention pertains to ball and seat valves designed to yield an increased resistance to failure of the seat when the seat is subjected to high stress.

BACKGROUND OF THE INVENTION

Ball and seat valves for a wide variety of applications have been utilized for a number of years. The seat typically includes a bore adapted to receive and engage the ball, the bore constituting an inlet/outlet for a liquid medium. When the pressure behind the ball is higher than the pressure on the opposite side of the seat, the ball is forced into the bore thereby shutting off the flow of liquid through the valve. When the pressure behind the ball becomes lower than the pressure on the opposite side of the seat, the ball tends to disengage from the seat bore and the liquid can flow freely through the bore. Other factors may affect the circumstances under which the ball engages and seals the bore, such as gravity and buoyancy of the liquid medium.

Many industries have begun to realize a need for ball and seat valves that can withstand both higher pressures and more corrosive environments. For example, subsurface pumps utilized to extract oil from subterranean formations rely on ball and seat valves for efficient extraction of the oil. The operating pressure and environment are very severe, and the failure of a ball and seat valve will cause the pump system to completely cease operation, resulting in costly repair, downtime, and production loss.

Ball and seat valves utilized in the petroleum industry and other industries can be subjected to environments that include very corrosive chemicals such as hydrogen sulfide, carbon dioxide and salt water, for extended periods of time. Often to alleviate some of the problems associated with utilizing ball and seat valves in such environments, ball and seat valves have been manufactured from a variety of materials, typically metallic in nature. For example, stainless steel, nickel-copper alloys, bronze, and other materials such as cemented carbides have been utilized. However, the wear resistance of many of these materials has been found to be insufficient for many applications. The metallic materials tend to wear down and degrade after a period of time, particularly in highly corrosive environments. In the petroleum industry, the valves must often be replaced on a monthly basis.

In some applications, attempts have been made to utilize ceramic materials to alleviate some of these problems. Ceramics are known to be highly resistant to many corrosive environments, such as acids and salt solutions.

U.S. Pat. No. 4,795,133 by Berchem et al., issued Jan. 3, 1989, discloses a ball valve having a valve seat including two sintered ceramic seat rings and a ceramic valve ball. Berchem et al. disclose that the ball valve is especially useful for fluids containing solvents and/or abrasive solids. Similar ceramic ball and seat valves are disclosed by Berchem in U.S. Pat. No. 4,815,704, issued Mar. 28, 1989, and Berchem et al. in U.S. Pat. No. 4,771,803, issued Sep. 20, 1988.

The inherent brittleness of ceramics has severely limited their use in high pressure applications. With ductile metals, localized stresses that exceed the yield point are relieved by local plastic deformation that redistributes the stress into a wider area, preventing fracture.

Ceramics, however, have no such yield point and fail catastrophically when localized stresses exceed the material strength. Ceramics typically have a higher modulus of elasticity than metals which results in fracture at relatively small strains, which compounds the problem. The result is that when the stress on a ceramic seat exceeds the material strength, the seat will fail catastrophically and crack or break apart. The ball and seat valve is then completely useless and must be replaced, resulting in down-time and consequential economic loss.

Attempts have been made to alleviate this particular problem by placing the seat portion of the ball and seat valve in compression. See, for example, "Downhole Products," a sales brochure distributed by Coors Ceramics Company. By placing the seat in compression, tensile force applied by the striking ball would have to overcome the compressive forces to fracture the ceramic. The "Downhole Products" brochure discloses a tightly wrapped stainless steel ring around the seat to place the seat in a compressed state. However, this design is not completely satisfactory since the ceramic seat is still subject to fracturing during assembly and use. Fracture during use can occur primarily because the seating and sealing occurs on two flat, parallel surfaces.

There exists a need in many industries to utilize ball and seat valves in high pressure and highly corrosive environments. A ball and seat valve constructed from a corrosion resistant material, such as a ceramic, would be beneficial. It would be extremely beneficial if the ball and seat valve was designed so that the ceramic is able to withstand a maximum amount of stress without failing catastrophically. It would also be beneficial if this could be achieved without significantly altering the design of present ball and seat valves.

SUMMARY OF THE INVENTION

In accordance with the present invention, an improved design for a ball and seat valve leads to increased reliability and increased resistance to fracture of the seat.

The ball and seat valve includes a spherical ball and a seat wherein the seat includes a beveled surface contiguous with its outer circumference, wherein the beveled surface is adapted to engage and seal against a receiving wall. In one embodiment, the seat is made from a ceramic material. Preferably, the ceramic material is selected from the group consisting of toughened zirconia, alumina, silicon carbide, silicon nitride, and whisker-reinforced composites thereof. The ball may also be made from a ceramic material.

Preferably, the beveled surface on the seat forms an angle with the central axis of the seat of between about 40° and about 50°. More preferably, the angle is about 45°. In one embodiment, the seat includes two beveled surfaces so that the seat may be inserted into a receiving cage in either direction.

In accordance with another aspect of the present invention, a cage assembly includes a ball and seat valve wherein the seat has a beveled surface contiguous with the outer circumference of the seat and a cage is adapted to receive the seat such that the beveled surface contacts and engages the inner surface of the cage, and the seat is forced against the inner surface, such that compressive forces are transmitted inwardly to the bore of the seat by the force exerted on the beveled surface. The assembly is particularly useful in a down hole sucker rod assembly for the extraction of oil from subterranean formations.

The present invention also provides a method for exerting a compressive force on the inner bore of a seat in a ball and seat valve, by providing the seat with a beveled surface on at least one edge, placing the seat in a receiving cage having an inner surface adapted to contact the beveled surface, and applying pressure to the seat to force the beveled surface against the inner surface to create a compressive force component directed toward the inner bore. Preferably, the beveled surface forms an angle with the central axis of the seat of from about 40° to about 50°.

According to another aspect of the invention, a method for extending the useful life of a ball and seat valve by exerting a compressive force toward the inner bore is provided. The compressive force is adjustable by altering the axial force exerted on the seat to change the compressive force exerted by a beveled surface located on the edge of the seat, preferably by adjusting the torque on a threaded plug that pushes against the seat.

BRIEF DESCRIPTION OF THE DRAWINGS

FIG. 1 shows an embodiment of a ball and seat valve in accordance with the present invention.

FIG. 2 shows a cross section of a seat in accordance with the present invention.

FIG. 3 shows an embodiment of a cage assembly including a ball and seat valve in accordance with the present invention.

DETAILED DESCRIPTION OF PREFERRED EMBODIMENTS

According to the present invention, the outer surface of the seat in a ball and seat valve includes at least one beveled edge. The beveled edge provides improvements in the utility and effectiveness of the ball and seat valve.

One advantage provided by the ball and seat valve of the present invention is an improvement in the strength and resistance to fracture of the seat. When the seat is firmly engaged in a receiving assembly, as discussed hereinbelow, the beveled edge engages the receiving assembly and compressive forces are thereby transmitted inwardly toward the bore of the seat. These compressive forces negate at least a portion of the tensile forces that are created when the ball strikes the bore of the seat.

The ball and seat design of the present invention increases the reliability and strength of a ball and seat valve made from any material. For example, the ball and seat valve may be fabricated from materials such as stainless steel, bronze, hardened alloys, cemented carbides such as titanium carbide or tungsten carbide, oxide ceramics, or non-oxide ceramics. While it is preferred that the ball and seat be constructed from substantially the same type of material, it may be advantageous for some applications to provide a ball and seat that are fabricated from different types of material.

The present invention is particularly useful when the seat is fabricated from a ceramic material. Ceramics are desirable in many ball and seat valve applications due to their inherent high resistance to chemical attack and corrosion. However, ceramics are known to fail catastrophically when subjected to tensile forces. By creating a compressive force component on the bore of the seat the tensile forces created when the ball strikes the seat can be significantly reduced.

A wide variety of ceramic materials may be useful in practicing the present invention. Preferably, the ceramic material has a high strength and a high toughness. For example, toughened zirconia, alumina, silicon carbide, and silicon nitride may be advantageously utilized. Any of the ceramic materials may have an increased toughness through the addition of whiskers or fibers, to create a whisker- or fiber-reinforced composite.

In a more preferred embodiment, the seat is manufactured from transformation-toughened zirconia. Transformation-toughened zirconia includes zirconia that is stabilized with, for example, additions of magnesia, calcia or yttria and also includes zirconia toughened alumina. One type of toughened zirconia available from the Coors Ceramics Company, Golden, Colo., has a flexural strength of about 620 MPa (ASTM test FA17-78), a compressive strength of about 1750 MPa (ASTM test C773-82), a hardness of about 12 GPa, and a fracture toughness of about 11 MPam$^{\frac{1}{2}}$.

Additionally, the beveled edge on the seat of the present invention also forms a sealing surface when the seat is placed into a receiving cage assembly. The beveled edge increases the area of the sealing surface over prior designs, providing an improved seal between the seat and the cage assembly. Thus, the leakage of fluids around the seat is substantially minimized. This is particularly advantageous when the fluid exerts high pressure on the seat.

Additionally, the beveled edge design gives a "self-centering" or aligning affect to the seat. That is, the edge self-aligns the seat in the receiving cage when placed therein.

Referring now to FIG. 1, a ball and seat valve 10 is shown. The ball 14 is substantially spherical and is adapted to engage the seat 18 by sealing against the inner sealing surface 30.

Referring to FIG. 2, the seat 18 includes an inner bore 34 and a outer circumference 46. A beveled edge 22 connects the surface of the outer circumference 46 and a top surface 38. The beveled edge 22 forms an acute angle with the central axis of the seat. Preferably, the angle is between about 40° and about 50°, and more preferably is about 45°.

When the seat 18 is placed into a receiving cage assembly, as discussed hereinbelow, the forces acting on the beveled edge 22 create a compressive force component exerting inwardly toward the bore 34 and, in particular, toward the inner sealing surface 30. Additionally, the surfaces of the beveled edge 22 and the top edge 38 form a large contact area for a sealing surface when engaged in a cage assembly. This increased sealing surface leads to a better seal and a reduction in leakage of fluid around the outside of the seat when compared to seats that have only a single sealing surface. The sealing surface area according to the present invention is the sum of the area of the top surface and the area of the beveled edge.

In the embodiment illustrated in FIGS. 1 and 2, the seat 18 includes a beveled edge on both the top 22 and bottom 26. In this way, the seat can be symmetrical and the direction in which is inserted into its receiving cage is not critical.

Referring to FIG. 3, a cage assembly 50 including a ball and seat valve that is particularly useful for a down hole sucker rod pump assembly is illustrated. Such assemblies are useful for drawing fluids such as oil from subterranean formations.

The downhole cage assembly 50 includes a cylinder 54 for enclosing the ball 14 and seat 18 within the assembly. The cylinder 54 is typically constructed from a metal such as 440 stainless steel or a nickel-copper alloy such as MONEL TM (Huntington Alloy Products Div., International Nickel Co., Inc., Huntington, W. Va.). A plug 58, or other adaptive device such as a connector or plunger, engages the cylinder 54 on the side of the seat 18 opposite the ball 14. Engagement means, such as threads 62, hold the plug 58 into the cylinder 54. The engagement means also maintain the plug 58 forcibly against the seat 18 to push the seat 18 against the inner wall of the cylinder 54. By exerting a force on the seat 18 along the central axis 70, the beveled edges 22 exert an inward force on the seat 18.

The inner wall of the cylinder 54 is adapted to engagedly receive the seat member 18. The cylinder 54 includes a cage element 67 having a first first diameter 66 which is adapted to receive the ball 14. The first diameter 66 is preferably slightly larger than the diameter of the ball 14 so that the ball 14 is not substantially restricted from movement along the central axis 70 of the cage assembly 50.

The cylinder 54 also includes an inner second diameter 74 that is larger than the first diameter 66. The inner diameter 74 is adapted to receive the outer circumference 46 of the seat 18. Thus, when the seat 18 is placed into the second diameter 74, the outer circumference 46 is substantially contiguous with the inner diameter 74 of the cylinder 54.

Between the first diameter 66 of the cage element 67 and inner diameter 74 of the cylinder 54, is a third surface 78 sloped relatively inward toward the central axis 70 of the cylinder 54. This sloped surface 78 is adapted to engagedly receive the beveled edge 22 of the seat 18 and seal the beveled edge 22 against the sloped surface 78.

A force is exerted on the opposite side of the seat 18 by the plug 58 when the plug 58 is affixed into the cylinder 54. The amount of force against the seat 18 can preferably be adjusted by, for example, the torque applied to the plug 58.

Thus, the force exerted on the seat 18 is transferred to the bore of the seat as a compressive force. The state of compression created is useful for improving the fracture resistance of the seat. Additionally, the beveled edge increases the area of the sealing surface for improved resistance to leakage of fluid around the seat. Also, the beveled edge helps the seat properly align in the cage assembly when placed therein.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A ball and seal valve, comprising:
   (a) a substantially spherical ball; and
   (b) a seat comprising a ceramic material, said seat comprising:
   (i) a bore adapted to engage said ball, wherein said bore has a central axis;
   (ii) a top surface and a bottom surface;
   (iii) an outer circumference; and
   (iv) a beveled surface substantially contiguous with said outer circumference and at least one of said top and bottom surfaces and forming an angle with said central axis of between about 40° and about 50°, wherein said beveled surface is adapted to engage and substantially seal against a receiving wall.

2. A ball and seat valve as recited in claim 1, wherein said seat consists essentially of a material selected from the group consisting of toughened zirconia, alumina, silicon carbide, silicon nitride, and whisker-reinforced composites thereof.

3. A ball and seat valve as recited in claim 2, wherein said ball consists essentially of a ceramic material.

4. A ball and seat valve as recited in claim 2, wherein said seat comprises two beveled surfaces.

5. A ball and seat valve as recited in claim 1, wherein said ball comprises a ceramic material.

6. A ball and seat valve as recited in claim 1, wherein said seat comprises two beveled surfaces.

7. A ball and seat valve as recited in claim 1, wherein said beveled surface forms an angle with said central axis of about 45°.

8. A ball and seat valve as recited in claim 1, wherein said beveled surface and one of said top and bottom surfaces form the sealing surface of said seat.

9. A cage assembly, comprising:
   (a) a substantially spherical ball; and
   (b) a seat comprising a ceramic material, said seat comprising:
   (i) a bore adapted to engage said ball, wherein said bore has a central axis;
   (ii) a top surface and a bottom surface;
   (iii) an outer circumference; and
   (iv) a beveled surface substantially contiguous with said outer circumference and at least one of said top and bottom surfaces, said beveled surface forming an angle with said central axis of between about 40° and about 50°;
   (c) a cage adapted to receive said seat wherein said beveled surface and said outer circumference contact and engage the inner surface of said cage; and
   (d) means to force said seat engageably against said inner surface, wherein compressive forces are transmitted inwardly to said bore by force exerted on said beveled surface.

10. A cage assembly as recited in claim 9, wherein said seat consists essentially of a material selected from the group consisting of toughened zirconia, alumina, silicon carbide, silicon nitride, and whisker-reinforced composites thereof.

11. A cage assembly as recited in claim 9, wherein said ball comprises a ceramic.

12. A cage assembly as recited in claim 9, wherein said cage assembly is utilized in a subsurface sucker rod pump.

13. A cage assembly as recited in claim 9, wherein said beveled surface forms an angle with said central axis of about 45°.

14. A method for exerting a compressive force component toward the inner bore of a ceramic seat in a ball and seat valve, comprising the steps of:

(a) providing a beveled surface on at least one edge of said seat wherein said beveled surface forms an angle with the central axis of said seat of from about 40° to about 50°;
(b) placing said seat in a receiving cage having an inner surface adapted to receive and contact said beveled surface; and
(c) applying the pressure to said seat to force said beveled surface against said inner surface and create a compressive force component toward said inner bore.

15. A method as recited in claim 14, wherein said beveled surface forms an angle with the central axis of said seat of about 45°.

16. A method for extending the useful life of a ball and ceramic seat valve by exerting a compressive force toward the inner bore of said seat, wherein the compressive force component in the direction of said inner bore is created by a beveled surface on said seat that forms an angle with the central axis of said seat of between about 40° and 50°, and is adjustable by altering the axial force exerted on said seat to change the compressive force exerted by said beveled surface.

17. A method as recited in claim 16, wherein said compressive force is adjustable by adjusting the torque on a threaded plug that pushes against said seat.

* * * * *